United States Patent
Yadlapati et al.

(10) Patent No.: US 11,853,559 B1
(45) Date of Patent: Dec. 26, 2023

(54) MIRROR WRITE CONSISTENCY CHECK POLICY FOR LOGICAL VOLUME MANAGER SYSTEMS

(71) Applicant: International Business Machines Corporation, Armonk, NY (US)

(72) Inventors: Lakshmi Yadlapati, Austin, TX (US); Veena Ganti, Austin, TX (US); Rui Yang, Austin, TX (US); Virginia Ann Wigginton, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/934,282

(22) Filed: Sep. 22, 2022

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS

| | | | |
|---|---|---|---|
| 6,636,984 B1 | 10/2003 | McBrearty | |
| 10,296,494 B2 | 5/2019 | Davis | |
| 10,594,784 B2 | 3/2020 | Kansal | |
| 2006/0224849 A1* | 10/2006 | Rezaul Islam | G06F 11/1666 711/170 |
| 2013/0074065 A1 | 3/2013 | McNeeney | |
| 2015/0134723 A1 | 5/2015 | Kansal | |
| 2018/0025025 A1 | 1/2018 | Davis | |
| 2018/0210781 A1 | 7/2018 | McBride | |

FOREIGN PATENT DOCUMENTS

| | | |
|---|---|---|
| CN | 103164254 A | 6/2013 |
| CN | 105138284 A | 12/2015 |
| CN | 106708662 A | 5/2017 |
| CN | 115061858 A | 9/2022 |

OTHER PUBLICATIONS

Disclosed Anonymously, "Method to improve GLVM asynchronous mirroring performance by leveraging server side caching", An IP.com Prior Art Database Technical Disclosure, IP.com No. IPCOM000262594D, IP.com Electronic Publication Date: Jun. 13, 2020, 6 pages.

(Continued)

*Primary Examiner* — Gurtej Bansal
(74) *Attorney, Agent, or Firm* — Gilbert Harmon, Jr.; Stephen Yoder

(57) ABSTRACT

Improving the runtime and discovery recovery performance for cloud-based logical volume management systems when performing mirror write operations. A mirror write consistency check (MWCC) policy that incorporates aspects of Active MWCC policies and Passive MWCC policies are utilized to more efficiently ensure that data is properly mirrored from a first copy of a logical volume to the second copy of a logical volume (as well as to potentially multiple other copies of the logical volume).

18 Claims, 3 Drawing Sheets

(56) References Cited

OTHER PUBLICATIONS

Disclosed Anonymously, "Performance Improvement of Write Operations in Geographic Logical Volume Manager", An IP.com Prior Art Database Technical Disclosure, IP.com No. IPCOM000239703D, IP.com Electronic Publication Date: Nov. 26, 2014, 3 pages.
Disclosed Anonymously, "System and method for in-memory high availability/disaster recovery solution", An IP.com Prior Art Database Technical Disclosure, IP.com No. IPCOM000228771D, IP.com Electronic Publication Date: Jul. 4, 2013, 6 pages.
Harris, Torry, "Cloud Computing—An Overview", 2017, 6 pages.
Saquib et al., "A new approach to disaster recovery as a service over cloud for database system", Conference Paper—Jan. 2013, ResearchGate, 7 pages.
International Search Report and Written Opinion, International Application No. PCT/CN2023/106942, International Filing Date Jul. 12, 2023.

\* cited by examiner

US 11,853,559 B1

MIRROR WRITE CONSISTENCY CHECK POLICY FOR LOGICAL VOLUME MANAGER SYSTEMS

BACKGROUND

The present invention generally relates to the field of logical volume managers, and more specifically to utilizing logical volume managers to be able to properly mirror large amounts of enterprise related data in a cloud-based environment.

SUMMARY

According to an aspect of the present invention, there is a method, computer program product and/or system that performs the following operations (not necessarily in the following order): (i) receiving, by a first logical volume (LV) of a volume group (VG), an original user data set, with the original user data set being stored on a first virtual persistent memory disk; (ii) mirroring, by a mirror write consistency check (MWCC) policy, the original user data set from the first copy of the LV to a second copy of the LV; (iii) determining that a first portion of the original user data set is not mirrored from the first copy of the LV to the second copy of the LV; (iv) assigning a set of virtual persistent memory disk to each logical partition of a plurality of logical partitions, with each logical partition tracking a pre-defined number of write operations; (v) examining, by the mirror write consistency check policy, a first portion of the set of virtual persistent memory disks to determine which write operation of the pre-defined number of write operations were erroneous; and (vi) responsive to the examination, mirroring, by the MWCC policy, the write operations that were deemed to be erroneous from the first copy of the LV to the second copy of the LV.

DETAILED DESCRIPTION

Figure 1:
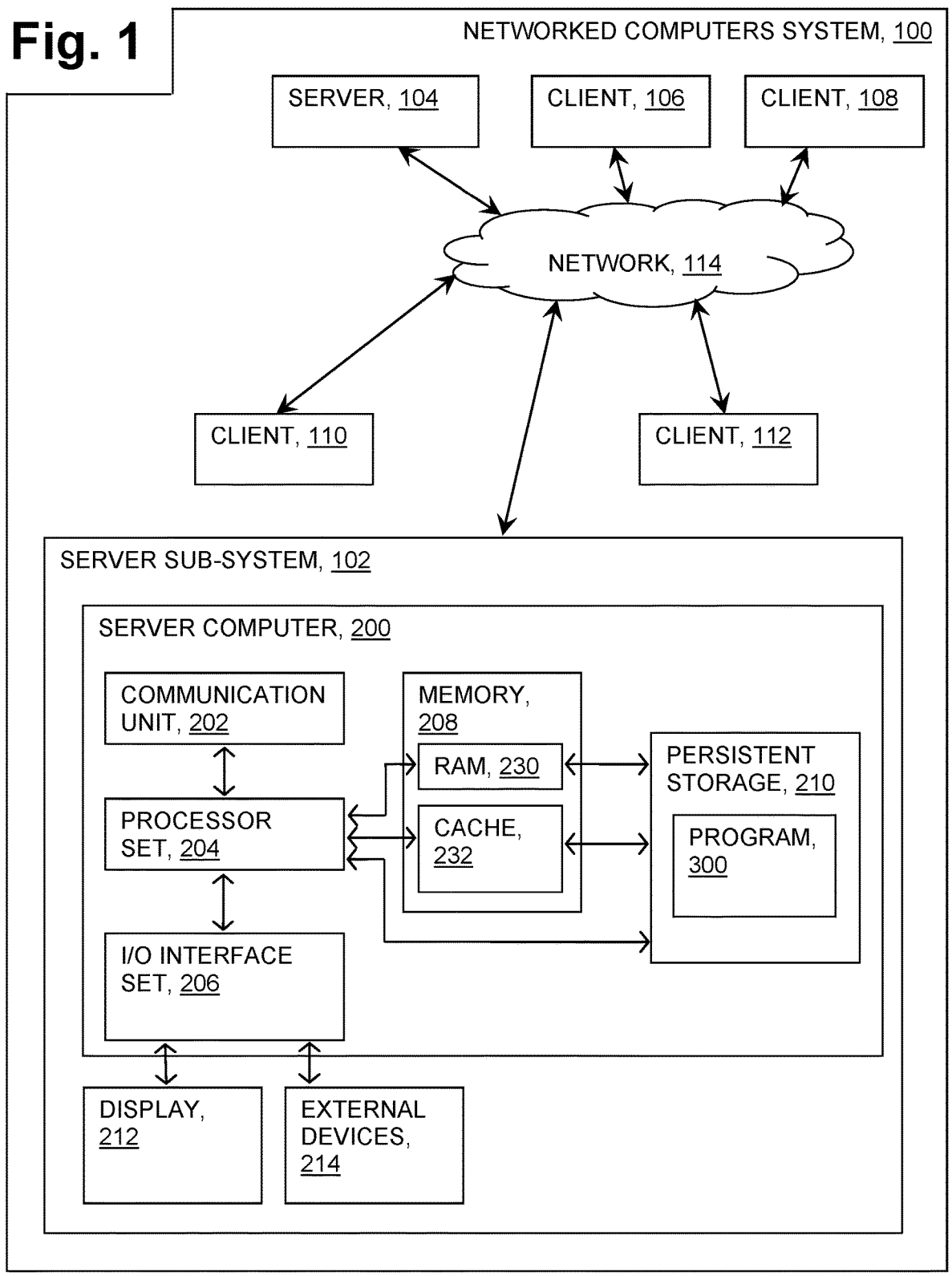
FIG. 1 is a block diagram view of a first embodiment of a system according to the present invention.

Some embodiments of the present invention are directed towards improving the runtime and discovery recovery performance for cloud-based logical volume management systems when performing mirror write operations. A mirror write consistency check (MWCC) policy that incorporates aspects of Active MWCC policies and Passive MWCC policies are utilized to more efficiently ensure that data is properly mirrored from a first copy of a logical volume to the second copy of a logical volume (as well as to potentially multiple other copies of the logical volume.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
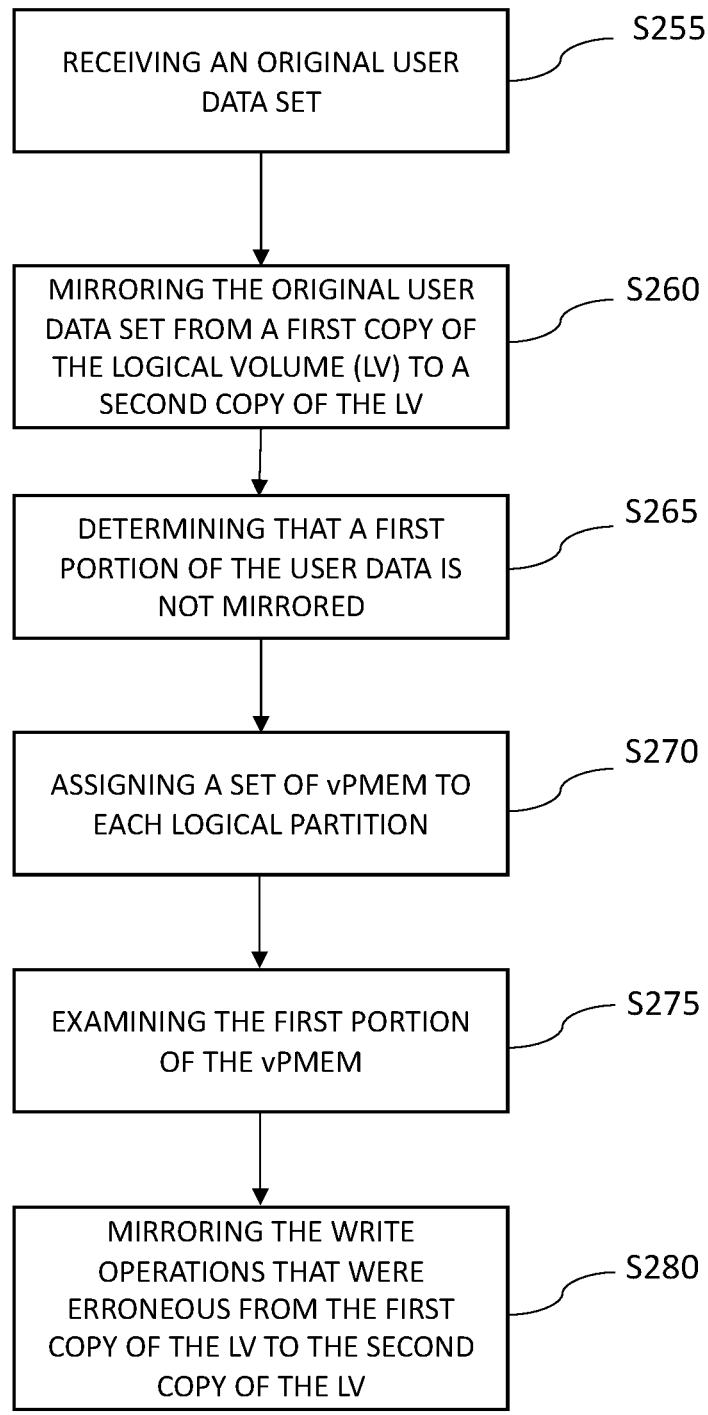
FIG. 2 is a flowchart showing a first embodiment method performed, at least in part, by the first embodiment system.
Figure 3:
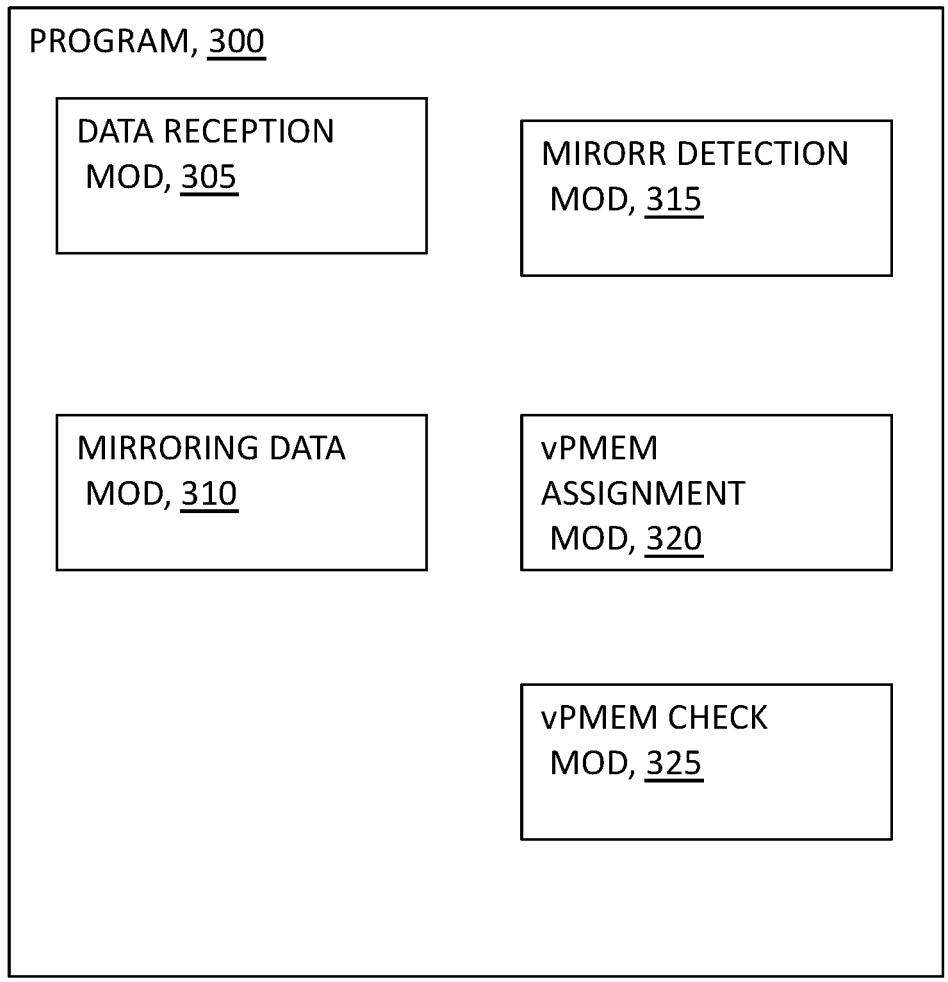
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where data reception module ("mod") 305 receives an original user data set. In some embodiments of the present invention, the original user data set includes any data that is originated and/or otherwise procured by an enterprise that is used in cloud computing environments. In some embodiments, the original user data set is a large data set (that is, the original user data set is a data set that is too large or complex to be utilized by traditional data processing methods). Additionally or alternatively, the original user data set is an application data set that is configured to be run on a physical server or virtual server.

Processing proceeds to operation S260, where mirroring data mod 310 mirrors the original user data set from a first copy of a logical volume to a second copy of a logical volume. In some embodiments of the present invention, mirroring data mod 310 uses a "hybrid" mirror write consistency check (MWCC) policy to mirror the original user data set from the first copy of the logical volume to the second copy of the logical volume. In some embodiments, mirroring data mod 310 mirrors uses the "hybrid" MWCC policy to mirror the original user least from the first copy of the logical volume to multiple other copies of the logical volume (that is, in at least one instance, the "hybrid" MWCC policy does not necessarily require a one-to-one association between copies of logical volumes).

Processing proceeds to operation S265, where mirror detection mod 315 determines that at least a first portion of the original user data set is not mirrored from the first volume group to the second volume group due to an error. Typically, when mirroring data in a cloud computing environment, errors sometimes occur where an incomplete set of data is mirrored. In some instances, a data set that has 99% of its contents mirrored from a first location to at least a second location can be problematic (especially when that data includes sensitive data—such as health related data or time sensitive data). In such an instance, this incomplete and erroneous mirroring of the data can cause the entire logical volume to be re-synced—which is inefficient with respect to properly utilizing computational resources and inefficient with respect to minimizing computational time.

In these instances, it is important that mirror detection mod 315 determines not only that at least a first portion of the original user data set is not mirrored, but also the extent to which that same data is not mirrored. This determination allows the "hybrid" MWCC policy to efficiently detect which data (that is, write data) is erroneous without having to read through the entire data set (as discussed in greater detail in Sub-Section III, below).

Processing proceeds to operation S270, where virtual persistent memory (vPMEM) assignment mod 320 assigns a set of virtual persistent memory disks to each logical partition that is included in at least the first volume group. In some embodiments of the present invention, these logical partitions are structured and configured to track a predefined number of write operations (such as 510 writes, as mentioned in Sub-Section III, below). Additionally or alternatively, vPMEM assignment mod 320 is structured and configured to add a signature to the volume group.

This signature (such as "LVM MWCC vPMEM," as mentioned below in Sub-Section III) is used by a logical volume manager (in this case, mod 320 acting as a logical volume manager) to add at least one virtual persistent memory disk to at least a first volume group that is compatible with the signature (that is, adding at least one virtual persistent memory disk to a volume group that cannot be failed when it is used for any MWCC purpose).

Processing proceeds to operation S275, where vPMEM check mod 325 examines the first portion of the original user data that is not mirrored (discussed in connection with operation S265, above). In some embodiments, vPMEM check mod 325 determines which sub-set of write operations that are included in the first portion of the original user data is erroneous (that is, which write operations were not mirrored, as discussed in greater in connection with operation S265, above). In some embodiments, vPMEM check mod 325 uses the "hybrid" MWCC to re-examine previous write operations up to the most previous 510 writes. These set(s) of 510 writes are used as the basis for mod 325 to efficiently and comprehensively identify all of the writes that were not mirrored from the first copy of the logical volume to at least the second copy of the logical volume.

Processing finally proceeds to operation S280, where mirroring data mod 310 mirrors the write operations that were deemed to be erroneous from the first copy of the logical volume to at least the second copy of the logical volume. In some embodiments of the present invention, mirroring data mod 310 uses the same "hybrid" MWCC policy to mirror the "erroneous" data from the original user data set (as discussed in connection with operation S255, above).

III. FURTHER COMMENTS AND/OR EMBODIMENTS

As used throughout this document, Virtual Persistent Memory (vPMEM) is an enhancement of a proprietary advanced virtualization platform and introduces the ability to configure persistent volumes using the conventional DRAM (dynamic random access memory) memory modules available in every IBM POWERS system onwards. Since vPMEM is built on DRAM technology, it has the same performance characteristics as DRAM, which enables IBM POWERS users to speed up their applications. In some instances, Virtual Persistent Memory volumes are persistent across LPAR (logical partition) reboots, but the contents are lost across CEC (Physical Server) reboots.

In some embodiments, AIX will add support to use vPMEM as disks. In some embodiments, asynchronous GLVM (geographic logical volume manager) provides AIX based mirroring of data across distance over network. The asynchronous GLVM can be deployed with a proprietary high availability system mirror to be used with a proprietary operating system or to be used as a standalone feature. The proprietary high availability system mirror provides interfaces for easy setup of the asynchronous GLVM and disk management systems. The GLVM feature is used for providing replication in the cloud.

Mirror Write Consistency Check (MWCC) is the logical volume policy which guarantees that mirrors are in consistent state (not latest) after a system crash and/or reboot.

There are two types of MWCC policies: Active MWCC and Passive MWCC.

With respect to Active MWCC, this LV (logical volume) policy includes the following aspects: (i) MWCC record is on each disk of the volume group; (ii) tracks the last 510 writes to a mirrored volume group; (iii) when a logical volume is using active MWCC, then write requests for this logical volume are held until the MWCC record is updated on disks; (iv) updates the MWCC record after the actual write request is done; and (v) if the LPAR (logical partition) crashes in the middle of performing writes, the last 510 writes to mirrors are examined upon reboot and one of the mirrors is used as a "source" to synchronize the mirrors.

The Active MWCC policy has a runtime performance impact. In some embodiments, a large batch of random writes go to an Active MWCC logical volume can cause all MWCC cache slots to be filled up. This results in the remaining I/Os to be in a pending queue.

With respect to Passive MWCC, this LVM policy includes the following aspects: (i) the volume group (VG) keeps track of the first open and last close of each of the logical volumes in the volume group metadata; and (ii) the policy negatively impacts disaster recovery performance. For instance, after a crash when the volume group is varied on, a vary-on process will automatically start a force sync of the whole logical volume that are in open state. Syncing the entire LV impacts the application performance after a system crash. Until the sync is complete, any reads to the LV will turn into writes to other mirrors. Additionally, because GLVM is used extensively in the cloud, even small network outages would cause significant performance impacts due to overlapping of SyncVG IOs with Cache I/Os, and the synchronization will start over from the beginning.

Embodiments of the present invention define a new MWCC policy that uses a combination of both Active MWCC and Passive MWCC policies that leverage the vPMEM disks.

In one embodiment, this "hybrid" MWCC policy utilizes the following operations (not necessarily in the following order): (i) add a vPMEM disk per logical partition (LPAR) that can be used for tracking active mirror request for all volume groups (VGs) in the LPAR; VG's in the LPAR; (ii) add the vPMEM to the root VG; (iii) add a new signature "LVM MWCC vPMEM" to the disk; (iv) have the LVM check the disk's signature before adding the disk to the VG; and (v) define a new MWCC policy that uses a combination of both active and passive MWCC policies that leverages the Virtual Persistent Memory (vPMEM) disks.

In some embodiments, the disk driver fails any non-LVM requests if the disk has a "LVM MWCC vPMEM" signature. This allows the disk to be used only for MWCC purposes. In some embodiments, the LVM provides a command to mark and/or clear the "LVM MWCC vPMEM" disk. In accordance with some aspects of the "Active" MWCC policy, the vPMEM will be divided into multiple chunks of one (1) megabyte (MB). This division tracks tracks 127,500 requests per volume group (VG), which is 250 instances of 510 writes.

Additionally, this new "hybrid" policy keeps track of open state(s) of the logical volume. If the logical partition (LPAR) crashes in the middle of performing write operations, then upon reboot, the last writes to the mirrors are recovered from the vPMEM disks and synched with the mirrors. Additionally, if the system reboots, then the whole logical volume is synched.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving, by a first logical volume (LV) of a volume group (VG), an original user data set, with the original user data set being stored on a first virtual persistent memory disk;
   mirroring, by a mirror write consistency check (MWCC) policy, the original user data set from the first copy of the LV to a second copy of the LV;
   determining that a first portion of the original user data set is not mirrored from the first copy of the LV to the second copy of the LV;
   assigning a set of virtual persistent memory disk to each logical partition of a plurality of logical partitions, with each logical partition tracking a pre-defined number of write operations;
   examining, by the mirror write consistency check policy, a first portion of the set of virtual persistent memory disks to determine which write operation of the pre-defined number of write operations were erroneous; and
   responsive to the examination, mirroring, by the MWCC policy, the write operations that were deemed to be erroneous from the first copy of the LV to the second copy of the LV.

2. The CIM of claim 1 further comprising:
   assigning, by the logical volume manager, a mirror write signature to the first virtual persistent memory disk so that the first virtual persistent memory disk is configured only for mirror write purposes.

3. The CIM of claim 1 further comprising:
   checking, by the logical volume manager, the mirror write signature of the first virtual persistent memory disk; and
   responsive to the checking, adding, by the logical volume manager, the first virtual persistent memory disk to the first volume group.

4. The CIM of claim 1 wherein a disk driver of the first virtual persistent memory disk fails a non-LVM request if the first virtual persistent memory disk has the mirror write signature.

5. The CIM of claim 1 wherein the mirror write consistency check policy allows each logical partition of the plurality of partitions is structured and configured to sync a last set of write operations from the first copy of the LV to the second copy of the LV if a client partition crashes during a write operation.

6. The CIM of claim 1 wherein the mirror write consistency check policy monitors a consistent state of mirror writes from the first copy of the LV to at least the second copy of the LV.

7. A computer program product (CPP) comprising:
   a computer readable storage medium; and
   computer code stored on the computer readable storage medium, with the computer code including instructions and data for causing a processor(s) set to perform operations including the following:
      receiving, by a first logical volume (LV) of a volume group (VG), an original user data set, with the original user data set being stored on a first virtual persistent memory disk,
      mirroring, by a mirror write consistency check (MWCC) policy, the original user data set from the first copy of the LV to a second copy of the LV,
      determining that a first portion of the original user data set is not mirrored from the first copy of the LV to the second copy of the LV, assigning a set of virtual persistent memory disk to each logical partition of a plurality of logical partitions, with each logical partition tracking a pre-defined number of write operations, examining, by the mirror write consistency check policy, a first portion of the set of virtual persistent memory disks to determine which write operation of the pre-defined number of write operations were erroneous, and responsive to the examination, mirroring, by the MWCC policy, the write operations that were deemed to be erroneous from the first copy of the LV to the second copy of the LV.

8. The CPP of claim 7 further comprising:

assigning, by the logical volume manager, a mirror write signature to the first virtual persistent memory disk so that the first virtual persistent memory disk is configured only for mirror write purposes.

9. The CPP of claim 7 further comprising:

checking, by the logical volume manager, the mirror write signature of the first virtual persistent memory disk; and responsive to the checking, adding, by the logical volume manager, the first virtual persistent memory disk to the first volume group.

10. The CPP of claim 7 wherein a disk driver of the first virtual persistent memory disk fails a non-LVM request if the first virtual persistent memory disk has the mirror write signature.

11. The CPP of claim 7 wherein the mirror write consistency check policy allows each logical partition of the plurality of partitions is structured and configured to sync a last set of write operations from the first copy of the LV to the second copy of the LV if a client partition crashes during a write operation.

12. The CPP of claim 7 wherein the mirror write consistency check policy monitors a consistent state of mirror writes from the first copy of the LV to at least the second copy of the LV.

13. A computer system (CS) comprising:

a processor(s) set;

a computer readable storage medium; and computer code stored on the computer readable storage medium, with the computer code including instructions and data for causing the processor(s) set to perform operations including the following:

receiving, by a first logical volume (LV) of a volume group (VG), an original user data set, with the original user data set being stored on a first virtual persistent memory disk, mirroring, by a mirror write consistency check (MWCC) policy, the original user data set from the first copy of the LV to a second copy of the LV, determining that a first portion of the original user data set is not mirrored from the first copy of the LV to the second copy of the LV, assigning a set of virtual persistent memory disk to each logical partition of a plurality of logical partitions, with each logical partition tracking a pre-defined number of write operations, examining, by the mirror write consistency check policy, a first portion of the set of virtual persistent memory disks to determine which write operation of the pre-defined number of write operations were erroneous, and responsive to the examination, mirroring, by the MWCC policy, the write operations that were deemed to be erroneous from the first copy of the LV to the second copy of the LV.

14. The CS of claim 13 further comprising:

assigning, by the logical volume manager, a mirror write signature to the first virtual persistent memory disk so that the first virtual persistent memory disk is configured only for mirror write purposes.

15. The CS of claim 13 further comprising:

checking, by the logical volume manager, the mirror write signature of the first virtual persistent memory disk; and responsive to the checking, adding, by the logical volume manager, the first virtual persistent memory disk to the first volume group.

16. The CS of claim 13 wherein a disk driver of the first virtual persistent memory disk fails a non-LVM request if the first virtual persistent memory disk has the mirror write signature.

17. The CS of claim 13 wherein the mirror write consistency check policy allows each logical partition of the plurality of partitions is structured and configured to sync a last set of write operations from the first copy of the LV to the second copy of the LV if a client partition crashes during a write operation.

18. The CS of claim 13 wherein the mirror write consistency check policy monitors a consistent state of mirror writes from the first copy of the LV to at least the second copy of the LV.

* * * * *